(12) United States Patent
Orlik et al.

(10) Patent No.: US 8,059,747 B1
(45) Date of Patent: Nov. 15, 2011

(54) METHOD FOR DECODING CODEWORDS TRANSMITTED OVER NON-COHERENT CHANNELS IN MIMO-OFDM NETWORKS USING GRASSMANN CODES AND SUPERBLOCKS

(75) Inventors: Philip V. Orlik, Cambridge, MA (US); Koike-Akino Toshiaki, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 12/827,250

(22) Filed: Jun. 30, 2010

(51) Int. Cl.
*H04B 7/02* (2006.01)
(52) U.S. Cl. ........ 375/267; 375/340; 375/261; 375/299; 375/347; 375/354; 714/779; 714/752; 714/758
(58) Field of Classification Search .................. 375/267, 375/340, 261, 354, 347, 299; 714/779, 752, 714/758
See application file for complete search history.

(56) References Cited

U.S. PATENT DOCUMENTS

| | | | |
|---|---|---|---|
| 2004/0125883 A1* | 7/2004 | Chang et al. | 375/261 |
| 2007/0041463 A1* | 2/2007 | Wang et al. | 375/267 |
| 2010/0226454 A1* | 9/2010 | Bliss et al. | 375/267 |
| 2011/0064167 A1* | 3/2011 | Rezk et al. | 375/340 |

* cited by examiner

*Primary Examiner* — Eva Puente
(74) *Attorney, Agent, or Firm* — Dirk Brinkman; Gene Vinokur

(57) ABSTRACT

Codewords encoded using non-coherent codes and received at a receiver via non-coherent channels in a multi-input, multiple output (MIMO) network using orthogonal frequency demultiplexing (OFDM) are decode by concatenating multiple adjacent codewords of a received signal into a superblock at the receiver. A projector matrix based on a codebook is predetermining. Each codeword in the superblock is projected onto an orthogonal complement of a correspond transmitted codeword using the projector matrix to obtain a corresponding distance metric of a generalized likelihood ratio test (GLRT) codeword. A minimal distance metric is selected to obtain an estimate of the transmitted codeword corresponding to a transmitted signal.

9 Claims, 6 Drawing Sheets

100

200

300

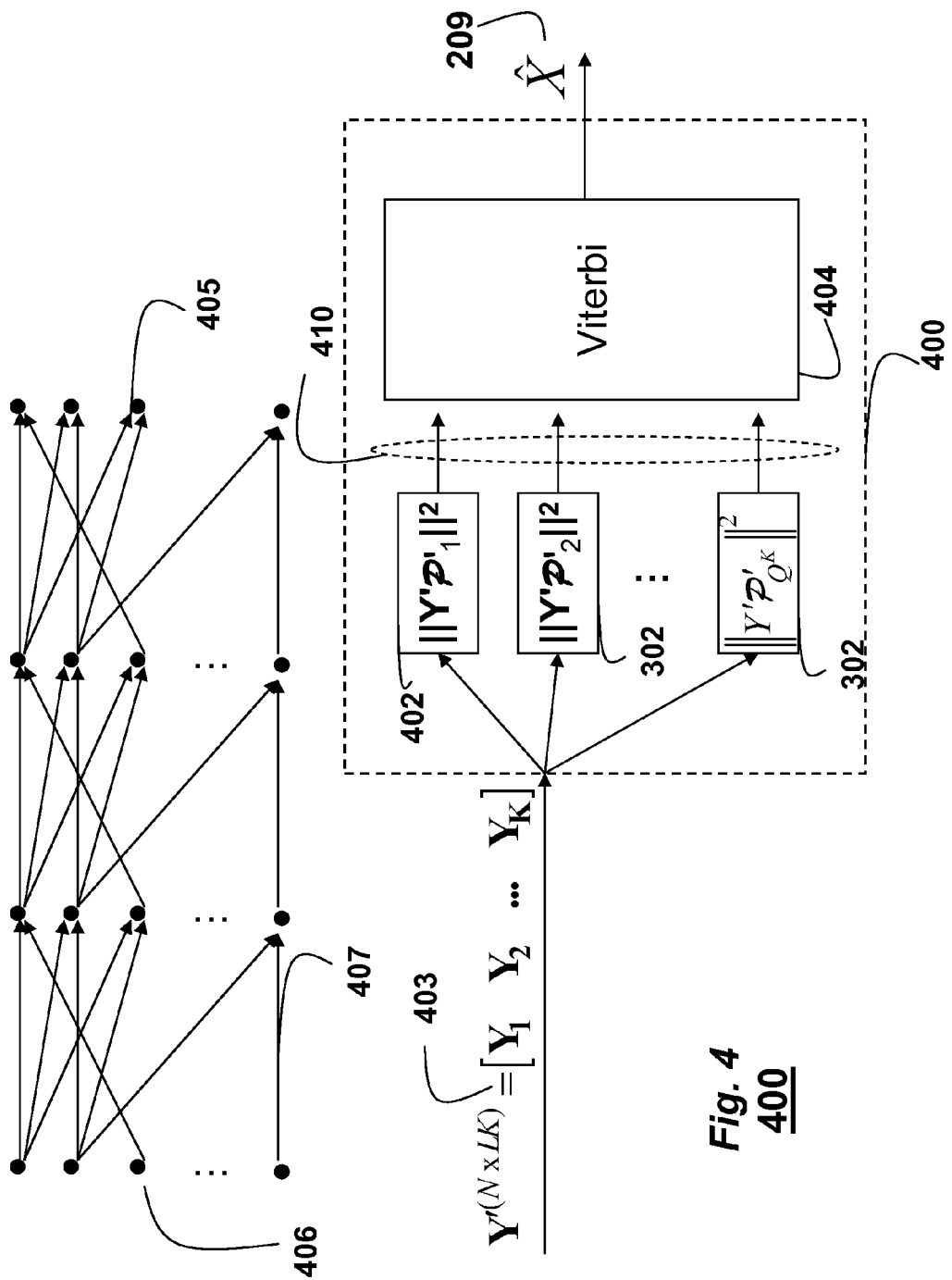

500

METHOD FOR DECODING CODEWORDS TRANSMITTED OVER NON-COHERENT CHANNELS IN MIMO-OFDM NETWORKS USING GRASSMANN CODES AND SUPERBLOCKS

FIELD OF THE INVENTION

This invention relates generally to multiple-input, multiple output network, and more particularly to Grassmann codes for non-coherent channels in MIMO-OFDM networks using generalized likelihood ratio test receivers.

BACKGROUND OF THE INVENTION

MIMO Networks

The use of multiple antennas in multi-input, multi-output (MIMO) networks can dramatically increase data throughput. In rich-scattering channel environments, the channel capacity increases linearly according to min(M, N), where M and N denote the number of transmit antennas and receive antennas, respectively. To achieve such capacity gains, accurate channel state information (CSI) is necessary for coherent communications.

CSI

Without CSI, there is non-coherent communications. For non-coherent channels, the capacity becomes a function of M'(1−M'/L) in high signal-to-noise ratio (SNR) environments, where M'=min(M,N, $\lfloor L/2 \rfloor$), and L denotes the coherence time (or, the length of a non-coherent codeword), where $\lfloor . \rfloor$ is the floor function.

Non-coherent codes include unitary space-time constellations, exponential mapping Grassmann codes, non-parametric Grassmann codes, and differential space-time modulations. Unitary space-time codes asymptotically achieve the non-coherent channel capacity for high SNRs. For such codes, optimal performance of maximum-likelihood decoding can be attained by using a generalized likelihood ratio test (GLRT) receiver, without having the CSI.

GLRT

The GLRT receiver uses implicit channel state estimation for each codeword of the non-coherent codes at the time of decoding. However, the performance of the conventional GLRT receiver degrades seriously when the channel coherence time is much shorter than the lengths of the non-coherent codes L. This constrains the code length to be reasonably short in practice. Shorter space-time codes in turn decrease the capacity gains for M'(1−M'/L).

SUMMARY OF THE INVENTION

The embodiments of the invention provide a method for signal processing in a non-coherent multiple input, multiple output (MIMO) network, which does not require channel state information (CSI) in either the transmitter or the receiver. With non-coherent codes on a Grassmann manifold, a receiver uses a generalized likelihood ratio test (GLRT) receiver for maximum-likelihood performance, even without having the CSI. However, the conventional GLRT receiver suffers from severe performance degradation when the channel state changes during a duration of a codeword, also known as a coding block, or simply block.

Therefore, we improve the conventional GLRT receiver using a high order and superblock, which is a concatenation of multiple adjacent codewords. The high order superblock makes effective use of correlated channels for adjacent codewords in slow fading channels, and can overcome changes in the channel while transmitting a codeword in fast fading channels.

BRIEF DESCRIPTION OF THE DRAWINGS

FIG. 4 is a block diagram of the receiver including a Viterbi decoder; and

DETAILED DESCRIPTION OF THE PREFERRED EMBODIMENTS

Embodiments of the invention provide a method for decoding codewords received at a receiver over non-coherent channels in a multi-input, multiple output (MIMO) network using orthogonal frequency demultiplexing (OFDM), and wherein the codewords are encoded using Grassmann codes.

In this description, matrices and vectors are indicated by bold-face italic letters in capital cases and small cases, respectively. A complex-valued matrix is $X \in \mathbb{C}^{m \times n}$, where $\mathbb{C}$ denotes a complex field. The notations $$X^*, X^T, X^\dagger, X^{31\ 1}, \text{tr}[X] \text{ and } \boldsymbol{X}_{X\|}$$

represent a complex conjugate (*), a transpose (T), a Hermite transpose (†), an inverse (−1), a trace (tr), and a Frobenius norm ($\|.\|$) of X, respectively. A vector-operation is denoted vec[.] aligns all columns of a matrix into a single column vector in a left-to-right manner, and ⊗ is the Kronecker product of two matrices. The set of real numbers is $\mathbb{R}$.

Non-Coherent MIMO-OFDM Networks and Signal Processing

Figure 1:
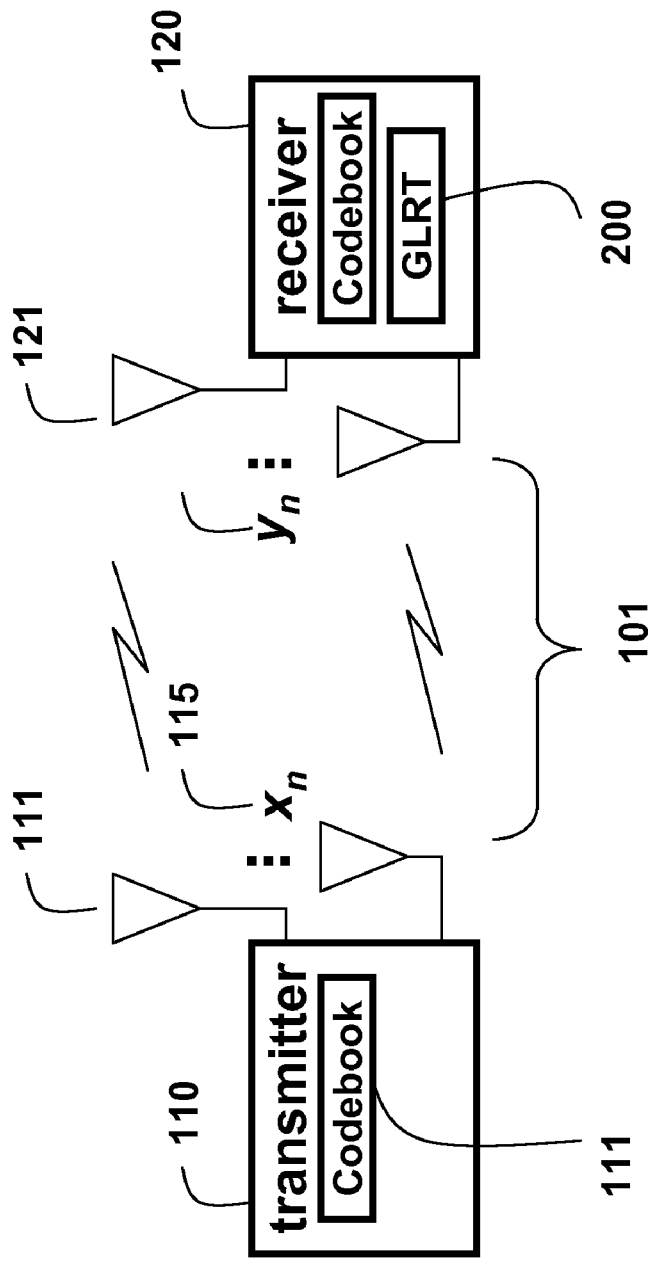
FIG. 1 is a block diagram of a MIMO-OFDM network including a transmitter and a receiver, wherein the receiver includes a generalized likelihood ratio test decoder according to embodiments of the invention.

In M×N multiple input, multiple output (MIMO) orthogonal frequency division multiplexing (OFDM) network 100, as shown in FIG. 1, a transmitter 110 has M transmit antennas 111, and a receiver 120 has N receive antennas 121. The transmitter and the receiver both store a space-frequency codebook 111. In one embodiment, the receiver includes a generalized likelihood ratio test (GLRT) decoder 200.

We focus on non-coherent communications wherein both the transmitter and the receiver do not have channel state information (CSI). The use of non-coherent codes enables us to communicate efficiently even when pilot signals or training sequences are not used during channel acquisition.

A signal transmitted from the M antennas 111 at the $n^{th}$ subcarrier can be expressed as a vector $x_n \in \mathbb{C}^{M \times 1}$ 115. A codeword X is transmitted as a block of L symbols $x_L$, which can be represented by the following matrix, $$X = [x_1, x_2, \ldots, x_L] \in \mathcal{X} \subset \mathbb{C}^{M \times L},$$

where $$\mathcal{X} = \{x_1, x_2, \ldots, x_Q\}$$

denotes the non-coherent space-frequency codebook 111 with Q distinct codewords. A mean energy of each codeword X is $E_s$, i.e., $$Q^{-1}\sum_{q=1}^{Q}\|X_q\|^2 = E_s.$$

Typically the length of the block is less than or equal to a channel coherence time. The coherence time is a measure of the minimum time required for the magnitude change of the channel to become uncorrelated from its previous value.

A signal $y_n$ 215 received at the receiver over the MIMO channels 101 is $$y_n = H_n x_n + w_n, \quad (1)$$

where at the $n^{th}$ subcarrier $$y_n \in \mathbb{C}^{N \times 1}, H_n \in \mathbb{C}^{N \times M} \text{ and } w_n \in \mathbb{C}^{N \times 1}$$

denote the received signal vector, the frequency-domain MIMO channel matrix and additive noise, respectively.

A conventional GLRT receiver assumes that the MIMO channel matrix remains constant during a single codeword for $n=1, \ldots, L$, such that $H_n = H$. This assumption can be relaxed for a high order codebook to deal with changes in the channel over the length of the codeword. This assumption of fading channels simplifies the expression of the received signal into a matrix form as follows:

$$Y = HX + W, \quad (2)$$

where Y and W respectively denote the received signals and the additive noise signals over the codeword, and $$Y = [y_1, y_2, \ldots, y_L] \in \mathbb{C}^{N \times L}, \quad (3)$$

$$W = [w_1, w_2, \ldots, w_L] \in \mathbb{C}^{N \times L}. \quad (4)$$

Noise $W_L$ is expressed as white Gaussian random variables with a variance of $\sigma^2$ $$\mathbb{E}[\text{vec}[W]\text{vec}[W]^\dagger] = \sigma^2 I_{NL}.$$

Generalized Likelihood Ratio Test (GLRT) Receiver

A conditional probability of the received signal Y, given the codeword X and the channel matrix H is known as the likelihood, which is expressed as $$Pr(Y \mid X, H) = \frac{1}{(\pi \sigma^2)^{NL}} \exp\left(-\frac{1}{\sigma^2}\|Y - HX\|^2\right)$$

where $\pi$ is a constant.

Without having the CSI, the GLRT receiver 120 determines an optimal estimate $\hat{X}$ for the codeword X from the codebook $\mathcal{X}$ 111 in favor of maximizing the likelihood, or equivalently minimizing a squared distance metric as $$\hat{X} = \arg\min_{X \in \mathbf{X}} \inf_{H} \|Y - HX\|^2 \quad (5)$$

where the function min returns a minimum, and the function inf is the infimum or greatest lower bound function.

Because the receiver does not have the channel state matrix H, the GLRT receiver uses the optimal channel matrix over all the possible realizations for each codeword. Because we have $$\frac{\partial}{\partial H^*}\|Y - HX\|^2 = -(Y - HX)X^\dagger, \quad (6)$$

a candidate channel estimate $$\hat{H} = YX^\dagger(XX^\dagger)^{-1}$$

can maximize the likelihood, where $XX^\dagger$ is invertible. This is equivalent to the well-known least-squares (LS) channel estimation given a candidate codeword X. Substituting $\hat{H}$ for H in Equation (5) yields $$\hat{X} = \arg\min_{X \in \mathbf{X}} \left\| Y \underbrace{(I_L - X^\dagger(XX^\dagger)^{-1}X)}_{P} \right\|^2 \quad (7)$$

where I is the identity matrix.

Here, a matrix $P \in \mathbb{P} \subset \mathbb{C}^{L \times L}$ denotes an idempotent projector onto the orthogonal complement of the codeword X, i.e., $XP=0$ and $PP=P$. The set $$\mathbb{P} = \{P_1, P_2, \ldots, P_Q\}$$

is a projector bank, whose $q^{th}$ member is defined as $$I_L - x_q^\dagger(x_q x_q^\dagger)^{-1} x_q,$$

for the codebook $\mathcal{X}$. The minimal size of the possible projector matrix P, such that $XP=0$, can be $L \times (L-M)$ because the orthogonal complement of the codeword X is also of size $L \times (L-M)$.

Figure 2:
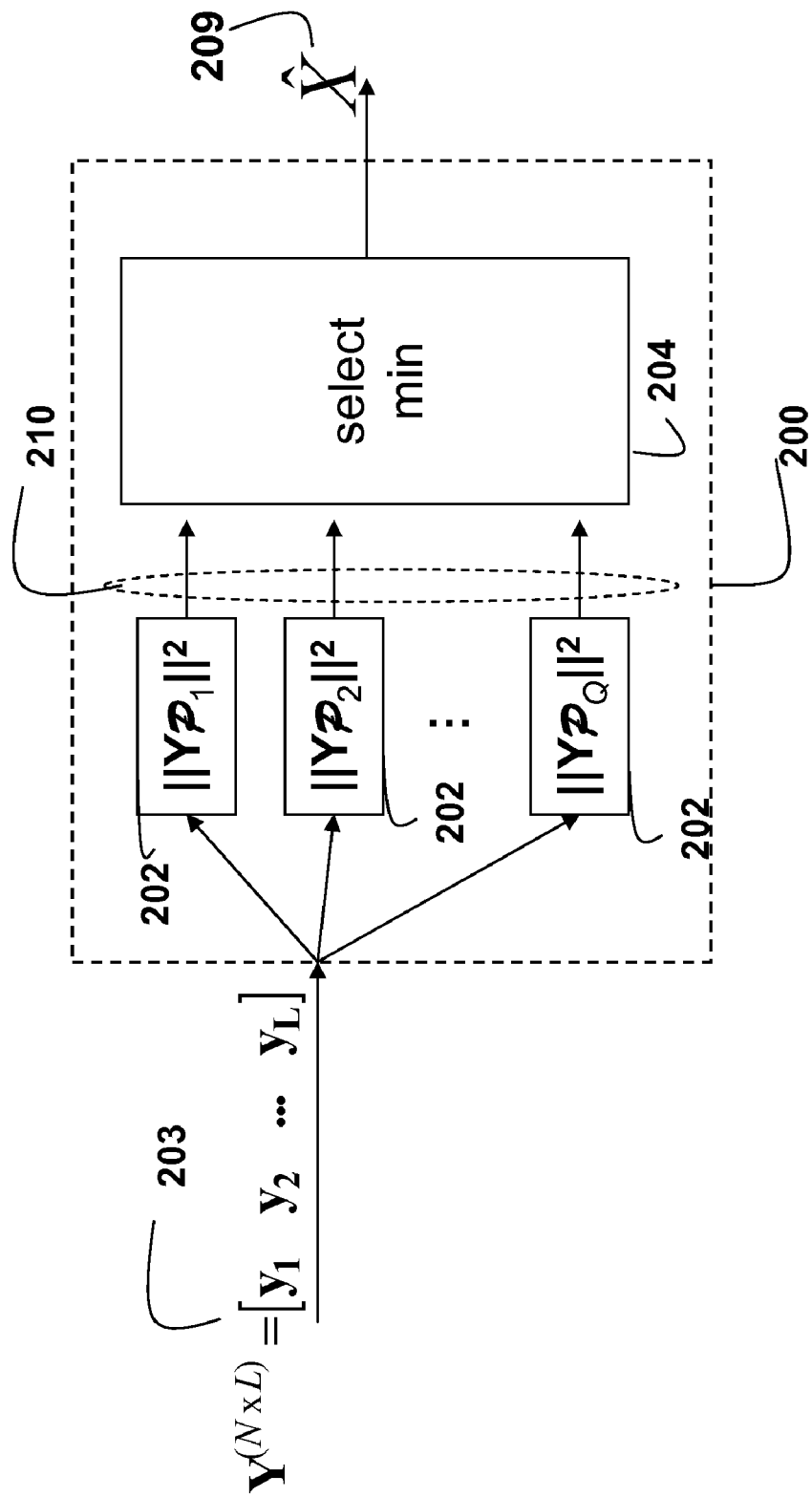
FIG. 2 is a block diagram of a receiver including a generalized likelihood ratio test (GLRT) decoder according to embodiments of the invention.

FIG. 2 shows an operation of our GLRT decoder 200 using Equation 7. The GLRT decoder 200 includes a set of projector matrices Q that project 202 the received signal 203 onto an orthogonal complement of each codeword in the codebook 111 to generate a distance metric 210. After projection 202, a minimum is selected 204 to obtain the estimate $\hat{X}$ of the transmitted codeword.

If every codeword X in the codebook $\mathcal{X}$ is unitary, such that $$x_q x_q^\dagger = (E_s/M) I_M$$

for any $q=1, 2, \ldots, Q$, then the GLRT distance metric can be simplified to $\max \|YX^\dagger\|^2$.

Non-Coherent Grassmann Codes

A number of non-coherent codes are known, e.g., unitary space-time codes, Grassmann codes with exponential mapping, Grassmann packing codes with numerical optimization, and differential modulations. We use a non-coherent Grassmann code based on an exponential mapping. The Grassmann code parameterized by an exponential mapping is $$X = \sqrt{\frac{E_s}{M}} [I_M 0_{M \times (L-M)}] \exp\left(\begin{bmatrix} 0_M & B \\ -B^\dagger & 0_{T-M} \end{bmatrix}\right).$$

The matrix $B \in \mathbb{C}^{M \times (T-M)}$ denotes a full-rate, full-diversity coherent space-time block code with a thin singular value decomposition (SVD) of $B = UAV^\dagger$. A cosine-sine decomposition yields $$X = \sqrt{\frac{E_s}{M}} [U \cos(\alpha A) U^\dagger \ U \sin(\alpha A) V^\dagger], \quad (8)$$

where $\alpha$ is a parameter that controls the codeword distance. Such a codeword always satisfies a unitary condition of $XX^\dagger =$ $(E_s/M)I_M$ for any arbitrary α and B. For M=2 and L=4, one choice of the coherent coding matrix B is $$B = \frac{1}{\sqrt{2}} \begin{bmatrix} s_1 + \phi s_2 & \vartheta(s_3 + \phi s_4) \\ \vartheta(s_3 - \phi s_4) & s_1 - \phi s_2 \end{bmatrix}, \quad (9)$$

where $$\theta^2 = \phi = \exp(j\pi/4).$$

An optimal parameter α is approximately 0.566. Each $s_i$ is drawn from quadrature phase shift keying (QPSK) constellations for a spectral efficiency of 2 bps per channel use. Grassmann codes offer the maximal degree of freedoms for non-coherent communications. However, it is not obvious that the parameter settings for θ and φ provide the optimal performance in sphere packing over the Grassmann manifold. We describe better Grassmann codes with optimized parameters using a gradient method.

High Order Superblock GLRT

In principle, the length L of the non-coherent codes should be less than or equal to the channel coherence time. However, shorter space-frequency codes have suboptimal performance with the conventional GLRT receiver because the accuracy of the LS channel regressions decreases linearly with the length L of the codeword (block).

Even for highly selective fading channels in the frequency-domain for space-frequency block coded (SFBC), the channel matrix has a high correlation for adjacent codewords, in general.

Figure 3A:
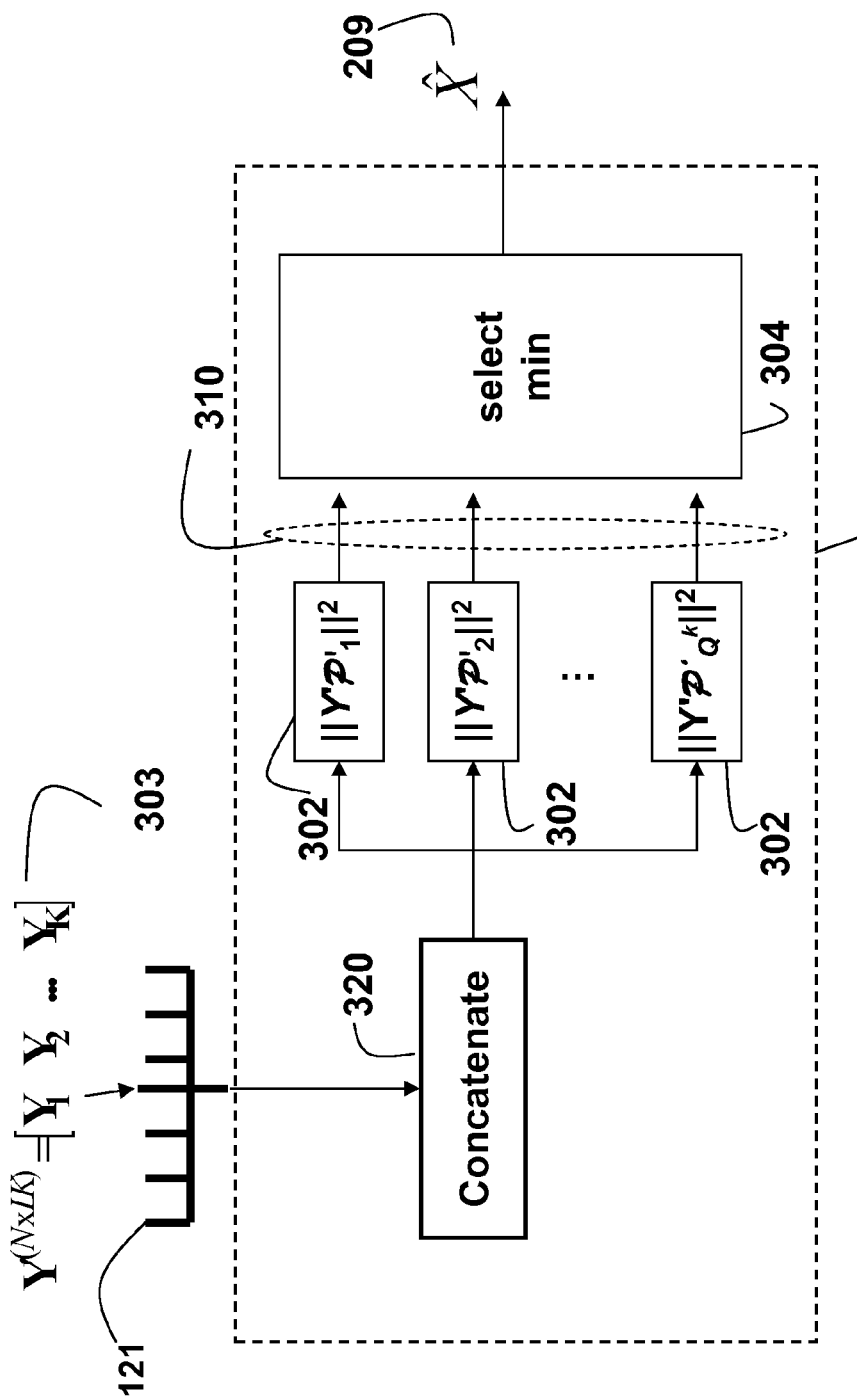
FIGS. 3A-3B are a block diagram of a structure and method of a receiver including a superblock generalized likelihood ratio test decoder according to embodiments of the invention.
Figure 3B:
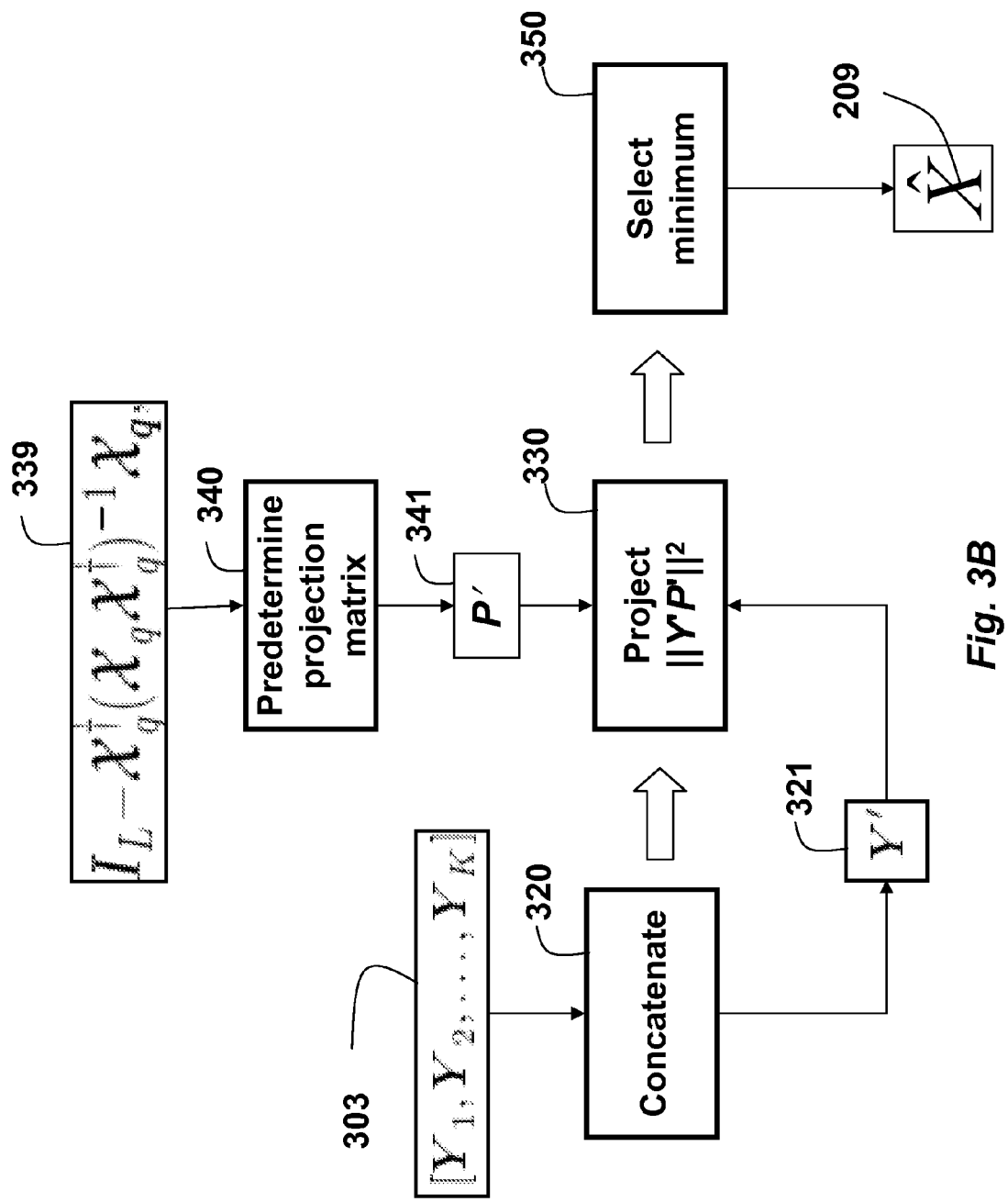

FIG. 3A and 3B respectively show the structure and operation of our superblock GRLT decoder 300. Because of the high correlation between adjacent codewords 303, we can improve performance by using channel correlations if we increase an effective length of the block by concatenating 320 multiple adjacent codewords into a superblock Y' 321 at the receiver. The superblock GLRT decoder 300 jointly estimates the K adjacent codewords 303 in the superblock Y'. At the $k^{th}$ codeword, the transmitted codeword is $X_k$, and the received codeword is $Y_k$. We respectively express the received signal and transmitted signal as $$Y' = [Y_1, Y_2, \ldots, Y_K] \in \mathbb{C}^{N \times LK}, \quad (10)$$

$$X' = [X_1, X_2, \ldots, X_K] \in \mathbb{C}^{M \times LK}, \quad (11)$$

wherein each element in the received signal Y' is an N×L matrix, and each element in the estimate X' of the transmitted signal is an M×L matrix.

We use the GLRT decoder 300 at the receiver 120 while the channel remains coherent over the K adjacent codewords in the superblock. Here, the signal X' is a codeword in a virtual codebook generated from the original codebook $X_k \in \mathcal{X}$.

A corresponding projector matrix P' 341 can be predetermined 340 from the projector bank 339, such that X'P'=0. In this case, P' can be determined in a similar manner as shown in Equation (7). The computational complexity increases exponentially with the number K of codewords because the cardinality of a superblock codebook becomes $Q' = Q^K$.

As shown in FIGS. 3A-3B, the input 303 is a concatenation of K received codewords $Y_K$ represented as Y' 321. The received signal is used to generate a set of distance metric 310, where the signal is projected 302 onto the orthogonal complement of each corresponding transmitted codeword in X. If we use unitary codes, then the GLRT metric reduces to $\|\Sigma Y_k X_k^\dagger\|^2$. After the projection 330, a minimum is selected 350 from the metric to obtain an estimate X' 209 of the transmitted codeword X.

Sequential Decision for Superblock GLRT

Because the superblock GLRT decoder 300 processes K codewords at the same time, some different decision criteria arise as follows.

The distance metric of the superblock GLRT decoder for K consecutive codewords from $X_{j+1}$ to $X_{j+K}$ can also be expressed as $$\mu_j = \|[Y_{j+1}, Y_{j+2}, \ldots, Y_{j+K}]P'\|^2.$$

One-Time Decision

To decode the $k^{th}$ SFBC, only the metric $\mu\lfloor k/K \rfloor - 1$ is used.

Selective Decision

To decode the $k^{th}$ SFBC, we select the optimal metric out of the adjacent metrics from $\mu_{k+K+1}$ to $\mu_{k+K-1}$.

Combined Decision

To decode the $k^{th}$ SFBC, we use a combined metric, which is summed over all the metrics from $\mu_{k+K+1}$ to $\mu_{k+K-1}$.

Sequential Decision

Here, we exploit the channel correlation across the codewords. This is done by Viterbi decoder 404 to select the optimal estimated codeword sequence over a trellis 405, of $Q^{K-1}$ states 406 as shown in FIG. 4. The total number of branch metrics 407 is $Q^K$, where the previous K−1 codewords are interpreted as trellis states. Along the trellis-state diagram, optimal decision can be obtained by the well known Viterbi algorithm.

Sequential decision has a highest complexity for the Viterbi algorithm but achieves the optimal performance.

In principle, the GLRT receiver assumes that the channel remains coherent during the superblock, or consecutive LK symbols. Hence, changes in the channel while transmitting the superblock can incur a performance degradation.

We describe an improved GLRT procedure, which uses high order LS channel estimation to overcome any changes in the cannel fluctuation the superblock. We use $D^{th}$ order polynomial curves to fit the channel fluctuation for high order LS regressions. Then, the channel matrix at the $n^{th}$ subcarrier is modeled as $$H_n = \sum_{d=0}^{D} H^{[d]} n^d = \mathcal{H} D_n, \quad (12)$$

where $$\mathcal{H} = [H^{[0]}, H^{[1]}, \ldots, H^{[D]}] \in \mathbb{C}^{N \times M(D+1)}, \quad (13)$$

$$D_n = [n^0 I_M, n^1 I_M, \ldots, n^D I_M]^T \in \mathbb{R}^{M(D+1) \times M}. \quad (14)$$

The matrix $H^{[d]}$ denotes the channel matrix at the $d^{th}$ order term of the polynomial. This model enables us to adopt the GLRT receiver even when the channel matrix $H_n$ changes in the frequency domain because the expanded channel matrix H remains static.

The received signal can be rewritten as $$Y' = \mathcal{H} \underbrace{\mathcal{D} \Lambda}_{X'} + W, \quad (15)$$

where D is the deterministic order expansion matrix of size M(D+1)×MLK and Λ is the diagonally aligned version of the transmitted signal matrix X, each of which is respectively defined as $$\mathcal{D} = [D_1, D_2, \ldots, D_{LK}] \in \mathbb{R}^{M(D+1) \times MLK}, \quad (16)$$

$$\Lambda = \begin{bmatrix} x_1 & & & \\ & x_2 & & \\ & & \ddots & \\ & & & x_{LK} \end{bmatrix} \in \mathbb{C}^{MLK \times LK}. \quad (17)$$

By considering $X' = \mathcal{D}\Lambda$ as a new virtual codeword, the associated projector matrix becomes $$P' = I_{LK} - \Lambda^\dagger \mathcal{D}^\dagger (\mathcal{D}\Lambda\Lambda^\dagger)^{-1} \mathcal{D}\Lambda \in \mathbb{C}^{LK \times LK}, \quad (18)$$

which can be determined in advance for any D and for all codewords. We note that the GLRT structure is similar to that of FIG. 3, however, due the polynomial model for H, the elements of the set of the projector matrices are now of dimension LK×LK.

Figure 5:
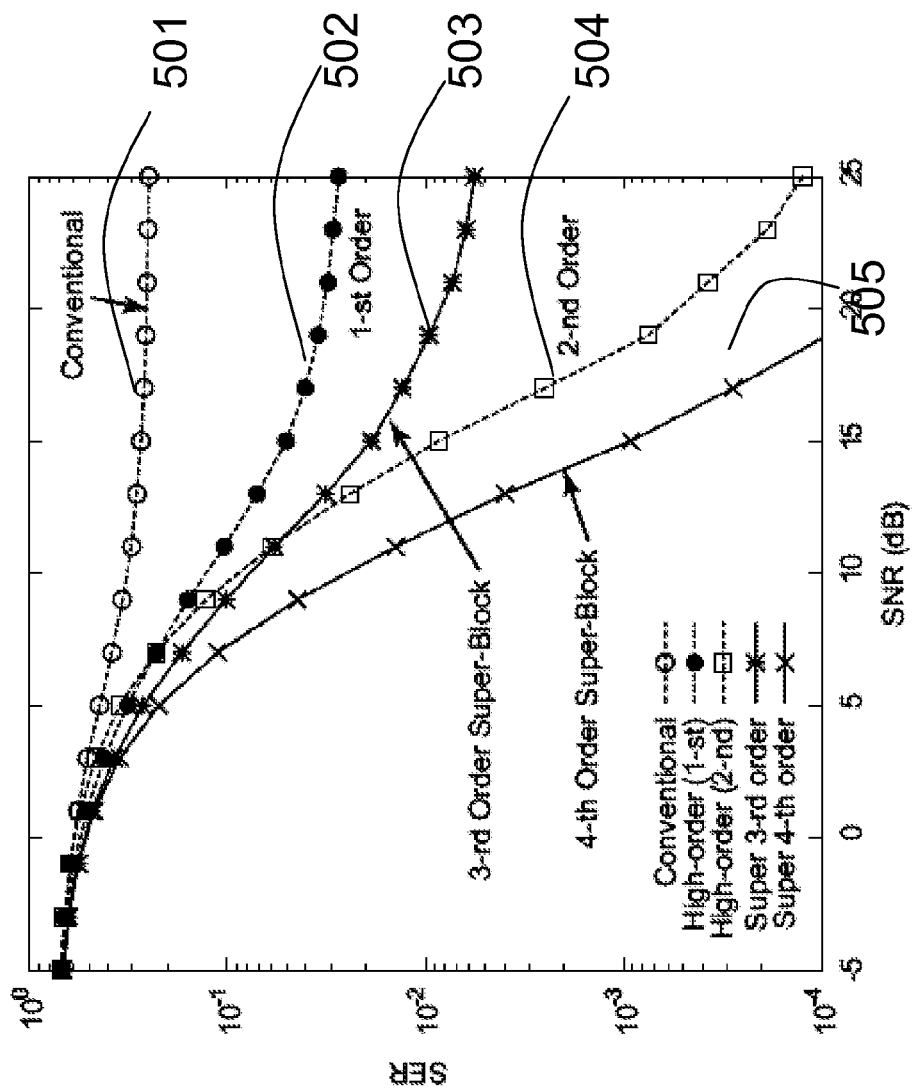
FIG. 5 is a graph comparing a conventional GLRT decoder to higher order GLRT decoders.

FIG. 5 graphically compares conventional GLRT decoding performance 501 and high order GLRT decoding performances 502-504, as a function of signal to estimation error ratio (SER) and signal-to-noise ratio, according to embodiments of the invention for transmissions over a highly frequency selective channel. We also show performance for the case when the higher order GLRT method is combined with the superblock method. The results show the performance over a highly frequency selective channel with 16 multipaths. As we see from the performance curves, the combination of the high order GLRT receiver with superblock processing has much better performance than conventional GLRT receivers.

Codebook Optimization of Non-Coherent Grassmann Codes

We optimize non-coherent codes by sphere packing on the Grassmann manifold. For numerical Grassmann packing, we adapt a gradient method to minimize the pairwise error probability between two codewords in high SNR regimes.

Pairwise Error Probability

The pairwise error probability between the correct codeword $X_i$ and the wrong codeword $X_j$, given a channel matrix H is $$Pr(\mathcal{X}_i \to \mathcal{X}_j | H) = Pr(\|Y\mathcal{P}_j\|^2 < \|Y\mathcal{P}_i\|^2 | H) \simeq$$
$$Pr(\|H\mathcal{X}_i\mathcal{P}_j\|^2 + 2\Re[tr[H\mathcal{X}_i\mathcal{P}_j W^\dagger]] < 0 | H) =$$
$$\frac{1}{2}\mathrm{erfc}\left(\frac{1}{2\sigma}\|H\mathcal{X}_i\mathcal{P}_j\|\right) \leq \frac{1}{2}\mathrm{erfc}\left(\frac{1}{2\sigma}\|H\|\lambda_{min}(\mathcal{X}_i\mathcal{P}_j)\right),$$

in the high SNR regimes, where erfc(.) is a complementary error function, and $\lambda$ min(.) denotes the minimal singular-value of a matrix. Note that $$\lambda_{min}^2(\mathcal{X}_i\mathcal{P}_j) = \lambda_{min}(\mathcal{X}_i\mathcal{P}_j\mathcal{X}_i^\dagger).$$

Our goal is to construct a codebook $\mathbb{X}$, which maximizes $\lambda_{min}(\mathcal{X}_i\mathcal{P}_j\mathcal{X}_i^\dagger)$ or any possible pair $i \neq j$. Here, we have $$\lambda_{min}(\mathcal{X}_i\mathcal{P}_j\mathcal{X}_i^\dagger) \geq t \iff \begin{bmatrix} \mathcal{X}_i\mathcal{X}_i^\dagger - tI_M & \mathcal{X}_i\mathcal{X}_j^\dagger \\ \mathcal{X}_j\mathcal{X}_i^\dagger & \mathcal{X}_j\mathcal{X}_j^\dagger \end{bmatrix} \geq 0.$$

A semi-definite programming (SDP) relaxation method can be used to maximize the parameter t with an energy constraint. The codebook obtained by the SDP is further refined by a linear programming (LP) method. We optimize the codebook for the high order superblock GLRT by the gradient method as a lower-complexity approach.

Gradient Method

For a given $\Omega_{i,j} = \mathcal{X}_i\mathcal{P}_j\mathcal{X}_i^\dagger$, the eigenvector $u_{i,j}$, which associated with the minimal eigenvalue $\lambda_{i,j} = \lambda_{min}(\Omega_{i,j})$ can yield the gradient in terms of $X_m$ as $$\nabla_{\lambda_{i,j}}^{[m]} = \frac{\partial \lambda_{i,j}}{\partial \mathcal{X}_m^*} = \frac{\partial}{\partial \mathcal{X}_m^*} u_{i,j}^\dagger \Omega_{i,j} u_{i,j} \quad (19)$$
$$= u_{i,j} u_{i,j}^\dagger \mathcal{X}_i \mathcal{P}_j \delta_{i,m}$$
$$- (\mathcal{X}_j\mathcal{X}_j^\dagger)^{-1} \mathcal{X}_j \mathcal{X}_i^\dagger u_{i,j} u_{i,j}^\dagger \mathcal{X}_i \mathcal{P}_j \delta_{j,m}.$$

Here, $\delta_{i,j} = 1$ if $i = j$, otherwise $\delta_{i,j} = 0$.

The steps of the method for constructing the codebook using the gradient method are:

1: Generate random codewords $X_m$ such that $\|X_m\|^2 = E_s$;
2: Determine $\Omega_{i,j}$ for all pairs $i \neq j$;
3: Select the pair that has the minimum $\lambda_{i,j}$ over all $i \neq j$;
4: Determine the eigenvalue $\mu_{i,j}$ for the selected pair (i,j);
5: Determine the gradient $\nabla_{\lambda_{i,j}}^{[m]}$ for all $m \in \{1, 2, \ldots, Q\}$;
6: Update the codewords as $x_m' \leftarrow x_m + \beta \nabla_{\lambda_{i,j}}^{[m]}$, where $\beta \in \mathbb{Z}$, 42 is a stepsize factor, which is optimized by line searching to maximize the corresponding $\lambda_{i,j}$;
7: Constrain the energy such that $\|X_m\|^2 = E_s$; and
8: Repeat from step 2, until $\lambda_{i,j}$ converges substantially.

Using multiple initial codewords or small perturbations of an optimized codebook, the gradient method yields a well-constructed codebook. The construction method for the high order superblock GLRT can be adapted because we have $\partial x_m' = \mathcal{D}\partial\Lambda_m$.

Optimization for Exponential Mapping Grassmann Codes

A numerical optimization method that was designed for non-parametric codes can now also be applied for some parametric non-coherent codes. As an example for our optimization method, an improved version of the exponential mapping Grassmann codes is described. The conventional Grassmann codes with exponential mapping use the fixed parameters $\theta$ and $\phi$ in Equation (9). We directly optimize these parameters by the gradient method with a slight modification as $$\frac{\partial \lambda_{i,j}}{\partial \gamma} = \sum_{m=1}^{Q} tr\left[(\nabla_{\lambda_{i,j}}^{[m]})^T \frac{\partial \mathcal{X}_m^*}{\partial \gamma}\right], \quad (20)$$

where $\gamma \in \{\alpha, \theta, \phi\}$ is the parameter to be optimized.

The optimized parameters and its gain in the minimal eigenvalue are shown in Table I.

TABLE I

| | α | θ | φ | min $\lambda_{i,j}$ |
|---|---|---|---|---|
| Conventional | 0.57 | exp(jπ/8) | exp(jπ/4) | 0.00023 |
| Optimized | 0.23 | 0.24 + j0.83 | 0.19 + j0.33 | 0.034 |

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for decoding codewords received at a receiver via non-coherent channels in a multi-input, multiple output (MIMO) network using orthogonal frequency demultiplexing (OFDM), and wherein the codewords are encoded using non-coherent codes, comprising the steps of:
concatenating multiple adjacent codewords of a received signal into a superblock at the receiver;
predetermining a projector matrix P' based on a codebook;
projecting each codeword in the superblock onto an orthogonal complement of a correspond transmitted codeword using the projector matrix to obtain a corresponding distance metric of a generalized likelihood ratio test (GLRT) codeword; and
selecting a minimal distance metric to obtain an estimate of the transmitted codeword corresponding to a transmitted signal.

2. The method of claim 1, wherein a length L of the superblock is less than or equal to a channel coherence time.

3. The method of claim 1, wherein the non-coherent codes are Grassmann codes and based on an exponential mapping.

4. The method of claim 2, wherein the received signal is $$Y'=[Y_1, Y_2, \ldots, Y_K], \text{ and}$$

the transmitted signal is $$X'=[X_1, X_2, \ldots, X_K],$$

wherein each element in the received signal Y' is an N×L matrix, and each element in the estimate X' of the transmitted signal is an M×L matrix, and wherein M and N respectively denote a number of transmit and receive antennas, and L is the length of the superblock.

5. The method of claim 4, wherein the projector matrix P' is predetermined from a projector bank $I_L - x_q^\dagger (x_q x_q^{554})^{-1} x_q$, such that X'P'=0, and wherein $I_L$ is an identity matrix, † is a conjugate transpose operator, and Q is a number of codewords X in the codebook $\mathcal{X}$.

6. The method of claim 5, wherein the distance metric is $$\arg\min_{X \in \mathcal{X}} \inf_H \|Y - HX\|^2,$$

wherein the function min returns a minimum, the function inf is an infimum, and H is a channel state matrix.

7. The method of claim 6, further comprising:
reducing the distance metric to $$\|\Sigma Y_k X_k^\dagger\|^2.$$

8. The method of claim 6, further comprising, expressing the distance metric as $$\mu_j = \|[Y_{j+1}, Y_{j+2}, \ldots, Y_{j+K}]P\|^2.$$

9. The method of claim 1, wherein an optimal sequence of estimated codewords is selected using a Viterbi trellis.

* * * * *